H. L. HEATON.
Nut-Lock.

No. 163,489.

Patented May 18, 1875.

UNITED STATES PATENT OFFICE.

HORACE L. HEATON, OF LILLY CHAPEL, ASSIGNOR OF ONE-HALF HIS RIGHT TO BENJAMIN F. ROBERTS, OF WEST JEFFERSON, OHIO.

IMPROVEMENT IN NUT-LOCKS.

Specification forming part of Letters Patent No. 163,489, dated May 18, 1875; application filed December 12, 1874.

*To all whom it may concern:*

Figure 1:
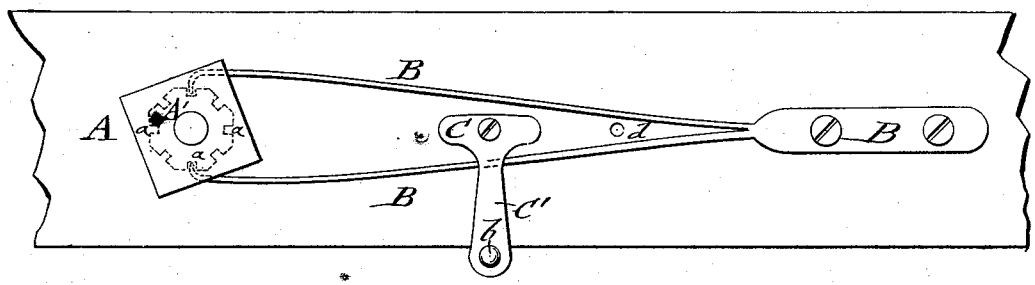
Figure 2:
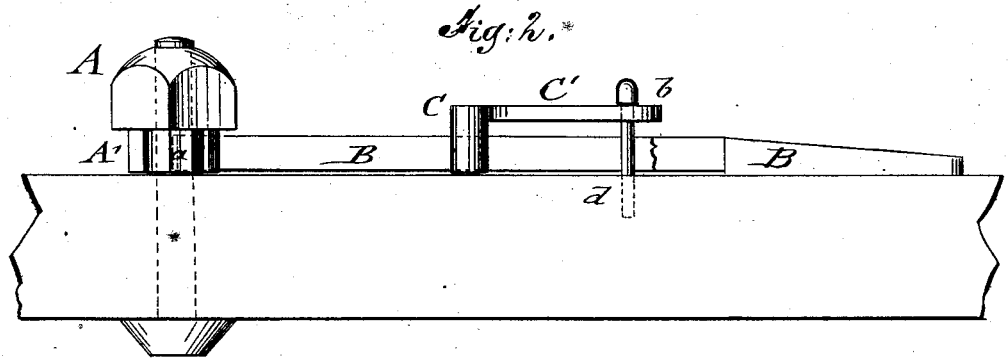

Be it known that I, HORACE L. HEATON, of Lilly Chapel, Madison county, Ohio, have invented a new and Improved Nut-Lock, of which the following is a specification:

Figure 1 represents a top view; Fig. 2, a side view of my improved nut-lock, and Fig. 3 a detail bottom view of the grooved nut detached.

Similar letters of reference indicate corresponding parts.

My invention relates to an improved spring nut-lock; and consists of a nut with a grooved extension or shank, in connection with a double spring entering into grooves at opposite sides of the shank, said spring being readily detached for removing or applying the nut by an intermediate pivoted cam-piece with handle part and drop-pin acting thereon for spreading and retaining the same.

Figure 3:
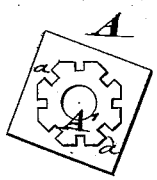

A represents a screw-nut, which is provided with a grooved extension or shank, A′, having notches or grooves $a$, as shown in Fig. 3. The forked or double spring B enters with its bent or hook-shaped ends into grooves at opposite sides of shank A′, being rigidly screwed or otherwise fastened with its opposite solid end to the plate, machine, or other object to which the nut is applied. The locking of the spring ends in the grooves retains the nut firmly in position on its bolt without being exposed to get loose by the vibrations of the parts connected. The double spring B may be quickly detached from the nut A by means of a cam, C, that is pivoted centrally between the legs of the spring, and provided with a lever-handle, $c′$, for swinging the cam around its pivot. The action of the cam on the spring-legs spreads them, so as to release them from the nut, and admit turning of the same for being taken off or tightened, as required. A drop-pin, $b$, passing through the outer end of cam-handle $c′$, is dropped into a socket-hole, $d$, of the plate, or other part to which the spring is attached, for securing thereby the open position of the spring, as indicated in Fig. 2, until, by the swinging back of the cam in longitudinal direction between the legs, the spring ends are allowed to engage the grooves of the nut again, locking thereby the nut in secure and substantial manner.

Having thus described my invention, I claim as new and desire to secure by Letters Patent—

1. The improved nut-lock, formed by a nut with grooved extension or shank, in connection with a forked double spring provided with bent or hook-shaped ends, entering into grooves at opposite sides of shank, substantially as specified.

2. The pivoted cam-piece, placed intermediately between the legs of the spring, and provided with operating lever-handle and drop-pin at outer end, in combination with the double spring and a socket-hole of the plate or other object to which the nut-lock is applied, for releasing the spring from the nut, and retaining the same in that position, substantially as specified.

HORACE L. HEATON.

Witnesses:
BENJAMIN F. ROBERTS,
CHARLES C. ROBERTS.